United States Patent
Jagadeesan et al.

(10) Patent No.: US 7,310,527 B2
(45) Date of Patent: Dec. 18, 2007

(54) METHOD AND SYSTEM FOR TRIGGERING HANDOFF OF A CALL BETWEEN NETWORKS

(75) Inventors: Ramanathan T. Jagadeesan, San Jose, CA (US); Bich Tu Nguyen, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 11/420,850

(22) Filed: May 30, 2006

(65) Prior Publication Data

US 2006/0205407 A1    Sep. 14, 2006

Related U.S. Application Data

(63) Continuation of application No. 10/661,265, filed on Sep. 12, 2003, now Pat. No. 7,082,301.

(51) Int. Cl.
*H04Q 7/20* (2006.01)
*H04Q 7/28* (2006.01)

(52) U.S. Cl. ........... 455/436; 370/331

(58) Field of Classification Search ........... 455/436, 455/438; 370/331
See application file for complete search history.

(56) References Cited

U.S. PATENT DOCUMENTS

| | | | |
|---|---|---|---|
| 5,081,679 A | 1/1992 | Dent | 380/48 |
| 5,548,808 A | 8/1996 | Bruckert et al. | 455/33.2 |
| 5,913,168 A | 6/1999 | Moreau et al. | 455/441 |
| 6,088,591 A | 7/2000 | Trompower et al. | 455/438 |
| 6,134,439 A | 10/2000 | Sipila et al. | 455/436 |
| 6,629,151 B1 | 9/2003 | Bahl | 709/250 |
| 7,009,952 B1* | 3/2006 | Razavilar et al. | 370/331 |
| 7,082,301 B2* | 7/2006 | Jagadeesan et al. | 455/436 |
| 2002/0085516 A1 | 7/2002 | Bridgefall | 370/329 |
| 2003/0133421 A1 | 7/2003 | Sundar et al. | 370/328 |
| 2004/0233840 A1 | 11/2004 | Bye | 370/210 |
| 2005/0059400 A1 | 3/2005 | Jagadeesan et al. | 455/436 |

OTHER PUBLICATIONS

Neskovic, et al, "*Modern Approaches in Modeling of Mobile Radio Systems Propagation Environment*", IEEE Communications Surveys, http://www.comsoc.org/pubs/surveys, Third Quarter 2000, 12 pages.

Dobkin, Dan, "*Indoor Propagation and Wavelength*", WJ Communications 802.11 RP propagation, V 1.4, 8 pages, Jul. 10, 2002.

Recommendation ITU-R P.1238-2, *Propagation data and prediction methods for the planning of indoor radiocommunication systems and radio local area networks in the frequency range 900 MHz to 100 GHz (Question ITU-R 211/3)*, 15 pages, 1997-1999-2001.

* cited by examiner

*Primary Examiner*—William D. Cumming
(74) *Attorney, Agent, or Firm*—Baker Botts L.L.P.

(57) ABSTRACT

A method for handing off a call between networks includes monitoring a quality of a first link between a mobile station and a wireless local area network (WLAN) when the mobile station is actively connected with the WLAN on a call and monitoring a quality of a second link between the mobile station and a cellular network when the mobile station is actively connected with the WLAN on the call. The method also includes handing off the call from the WLAN to the cellular network when the quality of the first link is less than a handoff trigger threshold for a drop count duration and when the quality of the second link is greater than a minimum cellular link quality threshold.

15 Claims, 2 Drawing Sheets

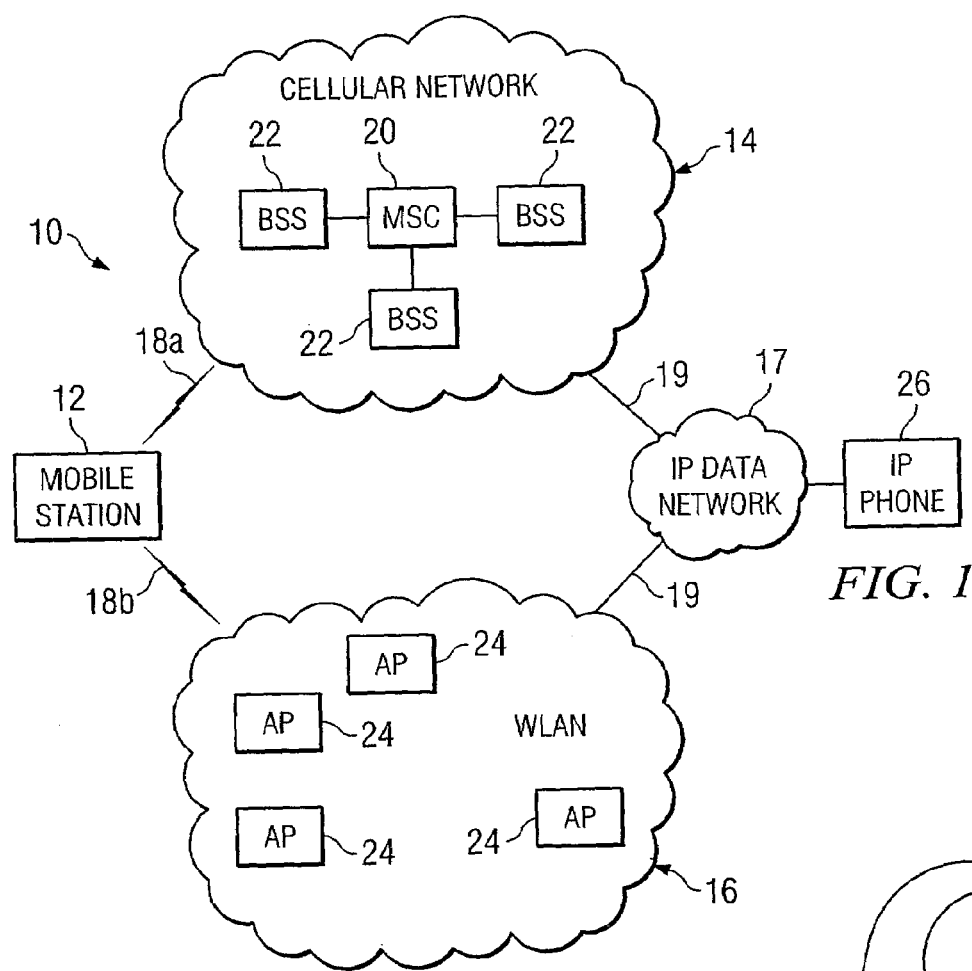
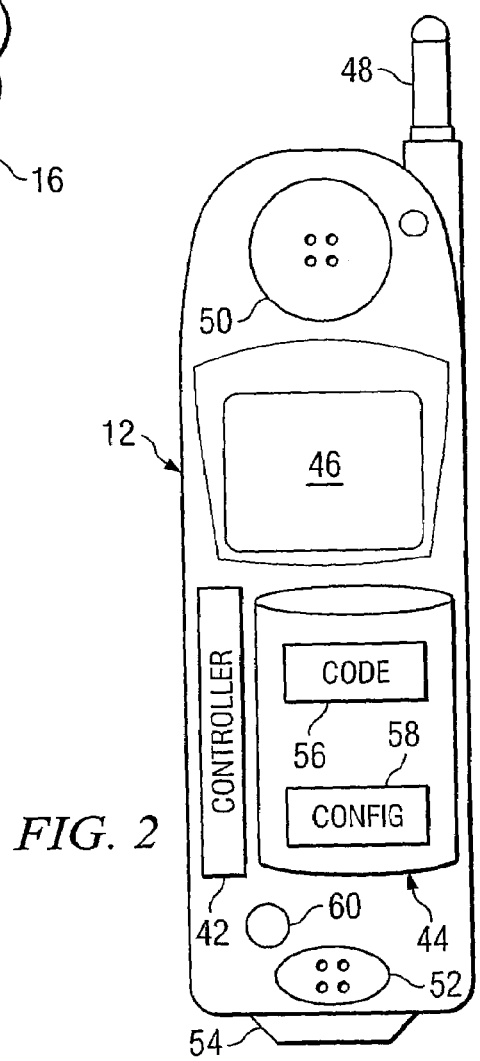
FIG. 1
FIG. 2

METHOD AND SYSTEM FOR TRIGGERING HANDOFF OF A CALL BETWEEN NETWORKS

CROSS-REFERENCE TO RELATED APPLICATION

This application is a continuation of U.S. application Ser. No. 10/661,265 filed Sep. 12, 2003 now U.S. Pat. No. 7,082,301 and entitled "Method and System for Triggering Handoff of a Call Between Networks".

TECHNICAL FIELD OF THE INVENTION

This invention relates in general to the field of wireless communications and, more particularly, to a method and system for triggering handoff of a call between networks.

BACKGROUND OF THE INVENTION

Wireless communication systems, such as 802.11 compliant systems, enable relatively short range, wireless communication of packets. These systems, originally designed for data communication, have now been put to use for telephony applications. This has introduced a range of problems, complexities and opportunities.

SUMMARY OF THE INVENTION

The present invention provides a method and system for triggering handoff of a call between networks that substantially eliminates or reduces at least some of the disadvantages and problems associated with previous methods and systems.

In accordance with a particular embodiment of the present invention, a method for handing off a call between networks includes monitoring a quality of a first link between a mobile station and a wireless local area network (WLAN) when the mobile station is actively connected with the WLAN on a call and monitoring a quality of a second link between the mobile station and a cellular network when the mobile station is actively connected with the WLAN on the call. The method also includes handing off the call from the WLAN to the cellular network when the quality of the first link is less than a handoff trigger threshold for a drop count duration and when the quality of the second link is greater than a minimum cellular link quality threshold.

The method may also include preventing a handoff of the call from the cellular network to the WLAN until expiration of a dwell timer as long as the quality of the second link remains above the minimum cellular link quality threshold. The method may further include monitoring the quality of the first link between the mobile station and the WLAN when the mobile station is actively connected with the cellular network on the call and handing off the call from the cellular network to the WLAN when the quality of the first link is greater than the handoff trigger threshold plus a hysteresis margin for a pick-up count duration. The WLAN may communicate using IEEE 802.11 protocol. Monitoring a quality of a first link between a mobile station and a WLAN may comprise monitoring a WLAN metric. The WLAN metric may comprise one of a group of metrics consisting of a received signal strength, a signal to noise ration, a signal quality, an error vector magnitude, a bit error rate and a packet error rate. Monitoring a quality of a second link between a mobile station and a cellular network may comprise monitoring a cellular metric. The cellular metric may comprise one of a group of metrics consisting of a received signal strength, a bit error rate and a frame error rate.

In accordance with another embodiment, a system for handing off a call between networks comprises a mobile station comprising a controller operable to monitor a quality of a first link between the mobile station and a wireless local area network (WLAN) when the mobile station is actively connected with the WLAN on a call. The controller is operable to monitor a quality of a second link between the mobile station and a cellular network when the mobile station is actively connected with the WLAN on the call. The controller is also operable to hand off the call from the WLAN to the cellular network when the quality of the first link is less than a handoff trigger threshold for a drop count duration and when the quality of the second link is greater than a minimum cellular link quality threshold.

The controller may be further operable to prevent a handoff of the call from the cellular network to the WLAN until expiration of a dwell timer as long as the quality of the second link remains above the minimum cellular link quality threshold. The controller may be further operable to monitor the quality of the first link between the mobile station and the WLAN when the mobile station is actively connected with the cellular network on the call and hand off the call from the cellular network to the WLAN when the quality of the first link is greater than the handoff trigger threshold plus a hysteresis margin for a pick-up count duration. The mobile station may further comprise a tuning knob operable to tune the hysteresis margin to change its value.

Technical advantages of particular embodiments of the present invention include a method for handing off a call of a mobile station from a wireless local area network (WLAN) to a cellular network and vice versa that monitors qualities of links between the mobile station and the networks to determine an appropriate time to make a handoff. Accordingly, a user of the mobile station currently on a call may move in and out of range of the WLAN, and the mobile station will automatically handoff the call from the cellular network to the WLAN and vice versa when appropriate depending on the quality of the links with the cellular network and the WLAN. Moreover, a dwell timer is utilized to prevent ping-pong of the call in time between the networks after a handoff occurs even if the quality of the link with the network from which the handoff occurred improves significantly. In addition, a hysteresis margin may be utilized to prevent ping-pong of the call in space between the networks.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments of the invention and their advantages, reference is now made to the following descriptions, taken in conjunction with the accompanying drawings, in which:

FIG. 1 illustrates a communication system for handing off a call between a cellular network and a wireless local area network, in accordance with a particular embodiment of the present invention;

FIG. 2 illustrates a dual-mode mobile station for handing off a call between a cellular network and a wireless local area network, in accordance with a particular embodiment of the present invention.

DETAILED DESCRIPTION OF THE INVENTION

Figure 3:
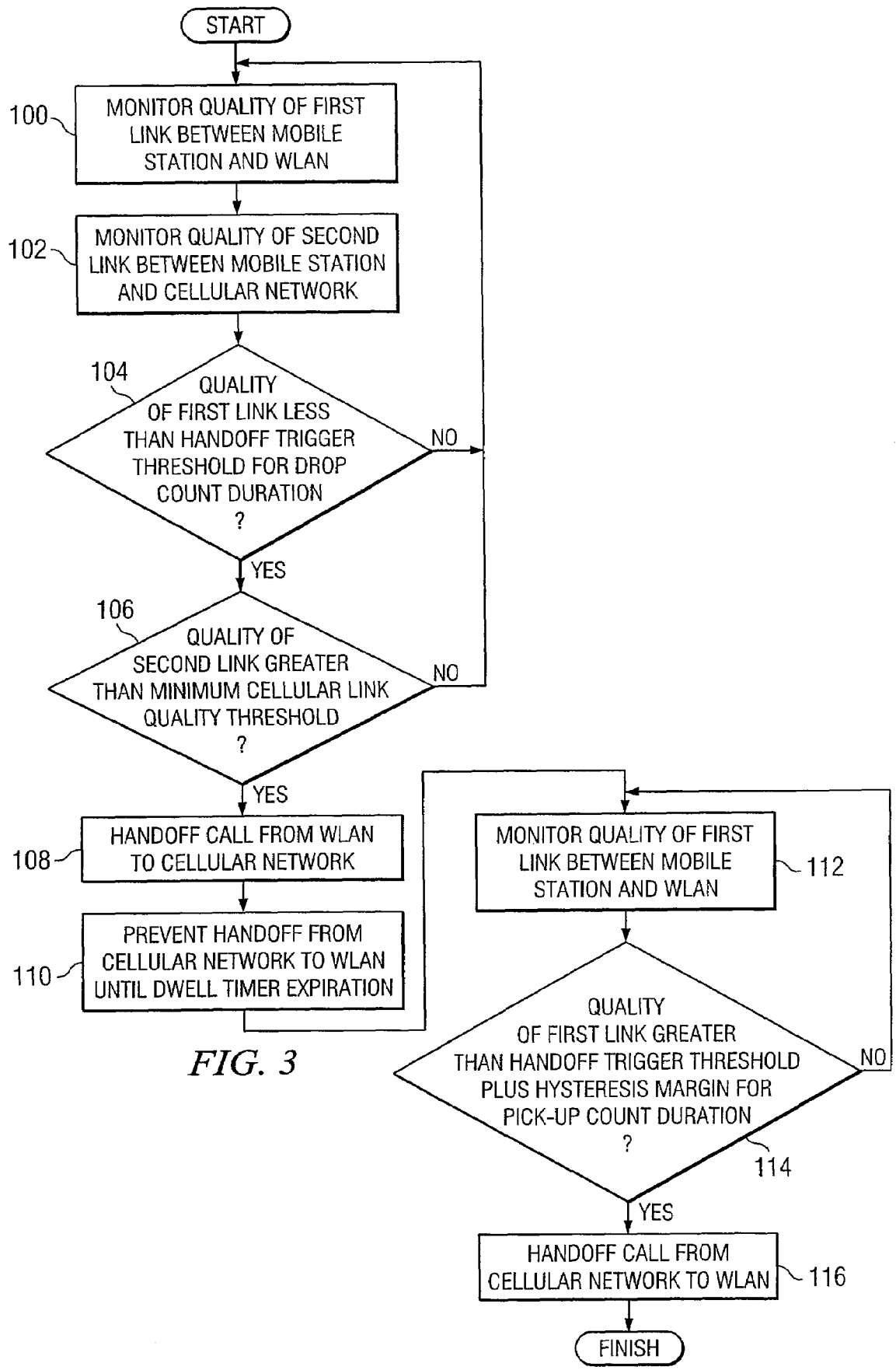
FIG. 3 illustrates a method for handing off a call between networks, in accordance with a particular embodiment of the present invention.

FIG. 1 is a simplified block diagram of a communication system 10 for handing off a call between a cellular network 14 and a wireless local area network (WLAN) 16, in accordance with a particular embodiment of the present invention. Communication system 10 includes a mobile station 12, internet protocol (IP) phone 26, cellular network 14, WLAN 16 and an IP data network 17. In particular embodiments, cellular network 14 may comprise a public network and WLAN 16 may comprise a private network. Communication system 10 provides for handoff of a call involving mobile station 12 from WLAN 16 to cellular network 14 and vice versa. For example, a user of mobile station 12 may currently be on a call with another endpoint, (e.g., IP phone 26) through an active link with WLAN 16. As the active link with WLAN 16 weakens as mobile station 12 leaves range of the WLAN, a handoff of the call from WLAN 16 to cellular network 14 may occur such that mobile station 12 is on the call with IP phone 26 through an active link with cellular network 14. Mobile station 12 includes dual-mode technology to support the transition from one network to another.

Communication system 10 also includes wireless links 18, which facilitate the delivery of voice data between mobile station 12 and cellular network 14 and WLAN 16. For example, wireless link 18a may facilitate communication of circuit-switched and/or packet-switched voice data between mobile station 12 and cellular network 14. It should be understood that wireless link 18a represents links between mobile station 12 and a plurality of potential base station systems 22 to which mobile station 12 may be connected, and wireless link 18b represents links between mobile station 12 and a plurality of potential access points 24 to which mobile station 12 may be connected. Communication system 10 also includes wireless or wireline communication segments 19 for coupling cellular network 14 and WLAN 16 with IP data network 17.

In particular embodiments of the present invention, mobile station 12 is a wireless handset, with dual-mode capability for communicating with both cellular network 14 and WLAN 16. In some embodiments, mobile station 12 may comprise other suitable devices used to communicate with cellular network 14 and WLAN 16, such as a computer, a personal digital assistant (PDA), a laptop or an electronic notebook, a telephone, a mobile terminal or any other device, component, element or object capable of initiating voice or data exchanges within communication system 10. Mobile station 12 may also include a suitable interface to a human user, such as a keypad, a microphone, a display, a keyboard or other suitable terminal equipment. Mobile station 12 may also be any device that seeks to initiate a communication session on behalf of another entity or element, such as a program, a database or any other component, device, element or object capable of initiating a voice or a data exchange within communication system 10. Data or information, as used herein in this document may refer to any type of numeric, voice, video, audio-visual or script data, or any type of source or object code, or any other suitable information in any appropriate format that may be communicated from one point to another.

Cellular network 14 includes base station systems (BSSs) 22, mobile switching center (MSC) 20 and a series of points or nodes of interconnected communication paths for receiving and transmitting circuit or packet-switched information that propagates to or from mobile station 12. A subscription or an agreement may be provided by cellular network 14 to offer cellular service to an end user of mobile station 12. Cellular network 14 offers a communicative interface between mobile station 12 and any suitable location within or external to communication system 10, such as network 17. Cellular network 14 may comprise a global system for mobile (GSM) architecture. In particular embodiments, cellular network 14 may comprise code division multiple access (CDMA), time division multiple access (TDMA) or frequency division multiple access (FDMA) environments. Cellular network 14 may cooperate with any version of a general packet radio service (GPRS) tunneling protocol (GTP) that includes a platform for executing data management operations. This may be inclusive of first generation, 2G, and 3G architectures that deliver a service or a capability to one or more clients or end users.

MSC 20 operates as an interface between BSSs 22 and other network components. MSC 20 represents a location that generally houses communication switches and computers and ensures that its cell sites in a given geographical area are connected. Cell sites refer generally to the transmission and reception equipment or components, potentially including a number of suitable base station systems that connect elements such as mobile station 12 to a network. By controlling transmission power and radio frequencies, MSC 20 may monitor the movement and the transfer of a wireless communication from one cell to another cell and from one frequency or channel to another frequency or channel. In a given communication environment, cellular network 14 may include multiple MSCs 20 that are operable to facilitate communications to and from base station systems 22. MSC 20 may also generally handle connection, tracking, status, billing information and other user information for wireless communications in a designated area. This may include, for example, the fact that a user of mobile station 12 is assigned certain wireless capabilities or use time.

BSSs 22 provide bi-directional communication with mobile station 12 over wireless link 18a. BSSs 22 may comprise any hardware, software, firmware or combination thereof operable to communicate with mobile station 12 over wireless link 18a. BSSs 22 may, for example, comprise one or more base transceiver stations that may comprise radio transmission/reception devices, components or objects, and antennas. The base transceiver stations may be coupled to base station controllers of BSSs 22 that use a landline (such as a high-speed T1/E1 line, for example) interface. The base transceiver stations may operate as a series of complex radio modems and may assist in performing a handover execution process where appropriate and may also perform transcoding and rate adaptation functions in accordance with particular needs.

BSSs 22 may also comprise one or more base station controllers that operate as a management component for a radio interface. This management may be executed through remote commands to a base transceiver station within cellular network 14. The base station controllers may manage more than one base transceiver station. Some of the responsibilities of a base station controller may include management of radio channels in assisting in handover scenarios.

Any number of suitable communications objects or elements may be included within, external to, or coupled to components of BSSs 22, such as base station controllers and base transceiver stations.

WLAN 16 is a wireless protocol network that connects to mobile station 12 through wireless link 18b. Such a protocol may be generally based on the IEEE 802.11 standard or on any other suitable architecture that provides for wireless communications in a network environment. WLAN 16 may be representative of a 'hot spot' or a public WLAN (PWLAN) where appropriate. WLAN 16 may be deployed in such public places as coffee shops, airports, restaurants, hotels and conference centers, for example, as a way to provide connectivity to mobile station 12.

WLAN 16 may include termination software, an extensible authentication protocol (EAP) and SIM platforms for facilitating authentication protocols associated with mobile station 12. WLAN 16 includes access points 24 operable to facilitate communication sessions, including authentication protocols in designated locations. Thus, access points 24 enable the wireless communication of packets containing any suitable data. Such packets may include voice data thus enabling voice communications by mobile station 12. WLAN 16 may also include an access router to aggregate access points within a corresponding hot spot. It may also provide a back haul from the public hot spot location to a corresponding core network whether that core network is reflected by a broker's network or an operator's network.

IP data network 17 enables communication between endpoints coupled to cellular network 14, WLAN 16 and IP data network 17, such as mobile station 12 and IP phone 26. IP data network 17 may be distributed across multiple cities and geographic regions. Communication system 10 may comprise other networks not explicitly illustrated, such as a wide area network (WAN), a public switched telephone network (PSTN) and a packet switched data network (PSDN). Networks of communication system 10 may include any number of other elements, such as switches, routers, hubs, call managers, endpoints, gateways and other suitable network components for enabling communication of data among such networks and mobile station 12.

IP phone 26 is a communication device coupled to IP data network 17 that seeks to establish a communication session, or call, with mobile station 12. In other embodiments, IP phone 26 may be replaced with any other suitable communication device such as a computer, a PDA, a laptop or an electronic notebook, a telephone (potentially coupled to a video conference bridge), a mobile station or any other device, component, element or object capable of initiating a voice or data exchange within communication system 10. The IP phone designation has been used for purposes of example only in providing one communication arrangement for discussion purposes. The IP protocol may be replaced with any suitable communication platform based on particular configuration needs.

FIG. 2 illustrates exemplary functional elements for mobile station 12, in accordance with a particular embodiment of the present invention. Mobile station 12 includes a controller 42, a memory 44, a display 46, a wireless interface 48, a speaker 50, a microphone 52 and an appliance interface 54. During operation, mobile station 12 provides voice telephony services using wireless communications. Mobile station 12 has dual mode functionality such that it may support multiple different communication modes, such as 802.11 and cellular protocols. Moreover, mobile station 12 includes functionality to enable a call involving the mobile station to be handed off between cellular network 14 and WLAN 16, depending on the quality of the wireless links between mobile station 12 and such networks.

For interactions with a user, mobile station 12 includes a number of user interfaces, including display 46, speaker 50 and microphone 52. Display 46 presents visual information detailing current status, available options and other suitable information. For example, display 46 may present a battery indicator, signal strength indicator, a menu of options and other suitable information depending upon a current state of mobile station 12. Speaker 50 and microphone 52 enable the generation and receipt of audio. Mobile station 12 may further include any number of input mechanisms, such as a knob 60, buttons and keypads, suitable for receiving input from a user.

Wireless interface 48 supports wireless, packet-based communications with other appropriately enabled devices. When operating within cellular network 14 on a call, wireless interface 76 communicates with BSSs 22 to send and receive data. When operating within WLAN 16 on a call, wireless interface 48 communicates with access points 24 to send and receive data.

Appliance interface 54 enables mobile station 12 to connect via any suitable interface with other appropriately enabled devices. According to particular embodiments, interface 54 permits charging of a battery within mobile station 12 and interfacing with other appropriately enabled devices. For example, interface 54 may include a serial interface, such as a universal serial bus (USB) port, for coupling to other equipment, such as a personal computer. Also, appliance interface 54 can support both wired and wireless communications.

Controller 42 manages the operation and control of mobile station 12. For example, controller 42 may be any suitable combination of microprocessors, programmed logic devices and other suitable controllers. During operation, controller 42 performs operations such as packetization and depacketization of audio, signal processing and other appropriate tasks. To support these operations, controller 42 may access information maintained within memory 44. Controller 42 may also access information maintained within memory 44 to monitor qualities of links between mobile station 12 and other networks to determine appropriate times to handoff a call between such networks. Controller 42 may also perform such handoff at an appropriate time according to certain conditions, as further discussed below generally with respect to mobile station 12.

Memory 44 represents any suitable combination of static and/or dynamic memory used by mobile station 12. In the illustrated embodiment, memory 44 maintains code 56 and configuration information 58. Code 56 includes software, logic modules, microcode and/or other suitable logic for use by elements of mobile station 12. For example, code 56 may include logic routines for implementing wireless communication protocols, for interacting with users, for establishing secure sessions, and for other appropriate operations. In particular embodiments, code 56 may include logic routines for monitoring quality of links 18a and 18b with cellular network 14 and WLAN 16, respectively, to determine when a handoff of a call from one network to another should be triggered. Code 56 may include an algorithm for making such determination and such handoff. Configuration information 86 includes settings and other configurations used during operation of mobile station 12. For example, configuration information 86 may include parameters used by an algorithm to determine an appropriate time to handoff a call from WLAN 16 to cellular network 14 or vice versa. In particular embodiments, a user or administrator of mobile station 12 may manually tune one or more of such parameters through knob 60.

While the embodiment illustrated and the preceding description focus on a particular embodiment of mobile station 12 that includes specific elements, it should be understood that particular embodiments contemplate mobile stations having any suitable combination and arrangement of elements for supporting dual mode functionality and handoff of a call from one network to another. Various items may be replaced, provided external to mobile station 12, or removed entirely from the architecture of mobile station 12. Moreover the elements that may be included in mobile station 12 may be reflective of accommodations being made for a particular type of communications protocol or based on selected performance parameters. Other elements could be added to such an architecture where appropriate in order to address some of these concerns, which may be in accordance with particular needs. It is critical to note the any of the elements identified below may be provided in any suitable software, hardware, processor, API, ASIC, object, module, algorithm or provided in any other suitable element where appropriate and based on particular communication protocols or architectures.

Mobile station 12 monitors link quality indicators (LQIs) of both WLAN link 18a and cellular link 18b. Link quality indicators indicate the quality of such links, and the monitoring of the LQIs helps to determine when it is appropriate to handoff a mobile station from one network to another during a call, for example from WLAN 16 to cellular network 14 or vice versa. In particular embodiments, such monitoring of link qualities may comprise monitoring qualities of links with multiple access points 24 of WLAN 16 and with multiple BSSs 22 of cellular network 14, notwithstanding the particular active link through which mobile station 12 may be connected on a call through cellular network 14 or WLAN 16.

In particularly embodiments, LQIs may comprise one or more metrics related to WLAN link 18b and cellular link 18a in order to evaluate the link qualities. Metrics that may be used to measure quality of WLAN link 18b may include received signal strength (RSS), signal to noise ratio (SNR), signal quality, error vector magnitude (EVM), bit error rate (BER) and frame/packet error rate. RSSI may be a predictor of link quality, bit error rate and packet error rate and may comprise a scalar value (e.g., 8 bits). SNR takes into account received signal strength and level of background noise or interference. Thus, in particular embodiments SNR may be a better predictor of bit error rate and packet error rate than RSS. Signal quality may be based on pseudorandom noise (PN) code correlation strength of a direct sequence spread spectrum (DSSS) receiver. Error vector magnitude is a physical layer (PHY) demodulation quality indicator. Metrics that may be used to measure quality of cellular link 18a may include RSS, BER and frame error rate. In addition to those link quality metrics discussed, other link quality metrics may be used in particular embodiments to indicate quality of WLAN link 18b and cellular link 18a.

As discussed above, particular embodiments may utilize more than one metric to indicate link quality of WLAN link 18b and/or cellular link 18a. For example, in particular embodiments an LQI may comprise a two or three dimension vector, for example (RSSI/SNR, SQ/EVM). In some embodiments, an LQI may comprise a scalar value representing a function of multiple link quality parameters. In other embodiments, other parameters may be utilized such as quality of service considerations and collision error rates.

For example, in some embodiments, quality of service parameters such as packet jitter, delay, WLAN collision error rate and channel utilization may be used to indicate WLAN link quality. Thus, in such embodiments a handoff to the cellular network may be triggered when WLAN VOIP quality of service drops below an acceptable level or when WLAN quality of service reservation fails due to admission control. Particular embodiments may also take into account in-building radio propagation environment factors.

In operation, when a mobile station 12 is on a call through a connection with WLAN 16, mobile station 12 monitors the LQI of access point 24 with which mobile station 12 currently has an active connection as well as the LQI of other potential target access points 24. Mobile station 12 also monitors the quality of cellular link 18a (e.g., the link between mobile station 12 and BSSs 22). Such monitoring may comprise measuring link quality at sample intervals, for example every 250 milliseconds in particular embodiments. A handoff of the existing call may occur from WLAN 16 to cellular network 14 if the LQI of cellular link 18a is greater than a cellular link minimum threshold and if the link quality of WLAN link 18b is less than a handoff trigger threshold for a certain count of sample intervals, also referred to as a drop count. For example, if link quality is measured every 250 milliseconds, then a handoff to cellular network 14 may be triggered if the LQI of WLAN link 18b is less than a handoff trigger threshold for, as an example, 8 out of 10 such measurements in a sliding window and if the LQI of cellular link 18a is greater than a cellular link minimum threshold. The use of a drop count prevents a short term dip in the LQI of WLAN link 18b from triggering a handoff to cellular network 14. This may prevent sudden changes in link quality (as a result of fading, for example) from triggering a handoff. The triggering of a handoff to cellular network 14 may occur, for example, when mobile station 12 leaves an enclosure in which WLAN 16 is installed or operational such that link 18b with WLAN 16 weakens.

The handoff trigger threshold and the cellular link minimum threshold may comprise any suitable values according to the WLAN link and cellular link qualities desired. Such threshold values will also depend on the particular metric(s) taken into account to determine link quality. The handoff trigger threshold may be set higher than a minimum acceptable LQI for WLAN link 18b in order to take into account an amount of time required to complete a handoff from WLAN network 16 to cellular network 14. This enables mobile station 12 to be connected to both WLAN network 16 and cellular network 14 at the same time during handoff and ensures that a connection is made with cellular network 14 before the connection with WLAN network 16 becomes inactive. The number of sample intervals required for the LQI of WLAN link 18b to be below the handoff trigger threshold (the drop count) may comprise any suitable values; for example, in particular embodiments as discussed above such drop count may be 8 out of 10 such samples.

After a handoff has occurred from WLAN 16 to cellular network 14, a handoff back to WLAN 16 is prevented for a certain period of time by a dwell timer as long as the LQI of cellular link 18a stays above the cellular link minimum threshold. Such dwell timer prevention prevents ping-ponging in time from one network to another, for example even if the LQI of WLAN link 18b improves significantly.

While the call is actively connected through cellular network 14, the LQI of WLAN link 18b is monitored. Such monitoring includes the monitoring of links with potential access points 24, including the access point with which mobile station 12 most recently had an active connection. A handoff back to WLAN network 16 is triggered if the LQI of WLAN link 18b is greater than the handoff trigger threshold increased by a hysteresis margin for a pick-up count duration. The pick-up count duration is similar to the drop count in that it requires the LQI to remain above the trigger threshold for a certain count of sample intervals, (e.g., sample intervals may comprise 250 or 500 milliseconds in particular embodiments).

The increase of the handoff trigger threshold by the hysteresis margin prevents a ping-ponging in space. The hysteresis margin may comprise any suitable value according to operational needs. The amount of the hysteresis margin may be adjusted according to a tradeoff between how much ping-ponging a user or administrator desires to tolerate versus how quickly a trigger is desired. In particular embodiments, the hysteresis margin may be fixed, while in some embodiments the hysteresis margin may be manually or automatically tunable. It should be understood that hysteresis functionality may additionally be used with respect to a handoff from WLAN network 16 to cellular network 14 in a similar manner to that described with respect handoff from cellular network 16 to WLAN network 14.

In particular embodiments, knobs or other controls may be provided for administrators or users to tune various parameters relating to the trigger of a handoff of one network to another. Such tunable parameters may include the dwell timer, drop count, pick-up count, trigger threshold and hysteresis margin. For example, the turning of a knob could result in a change of the trigger threshold from its default value. In some embodiments, a single knob or controller may be mapped to variation of more than one parameter.

The operational example discussed above describes handoff of a call from WLAN 16 and to cellular network 14 and back to WLAN 16. This example assumes that a preferred or default network of mobile station 12 is WLAN 16. For example, a controlling factor in whether mobile station 12 remains actively connected with WLAN 16 is the quality of WLAN link 18b.

In other embodiments, a preferred or default network may be cellular network 14. In this situation, a controlling factor in whether mobile station 12 remains actively connected with cellular network 14 may be the quality of cellular link 18a. For example, mobile station 12 may be actively connected with cellular link 18a on a call, and a handoff may be triggered when the quality of cellular link 18a is less than a handoff trigger threshold for a drop count duration and when the quality of WLAN link 18b is greater than a minimum WLAN link quality threshold. A dwell timer may be used to prevent ping-pong of a call recently handed off to WLAN 16. A handoff back to cellular network 14 from WLAN 16 may be triggered when the quality of cellular link 18a is greater than the handoff trigger threshold plus a hysteresis margin for a pick-up count duration.

It should be understood that while, as discussed above, network preferences may be included into the operation of mobile station 12 (e.g., cellular network 14 or WLAN 16 as a preferred network), any number of other policies or preferences may be utilized by mobile station 12 to determine when a handoff is triggered. For example, in particular embodiments it may be desired that a handoff from a cellular network to a WLAN or vice versa may not be allowed in certain situations. Such operational needs may be implemented in various embodiments. Moreover, while the teachings and functionality discussed herein with respect to mobile station 12 apply to the situation when the mobile station is on a current call with a network, such functionality can also be implemented during a call setup process (e.g., as the mobile station is deciding to which network it should be actively connected to begin a call).

As discussed above, particular embodiments may monitor more than one metric indicating link quality to determine appropriate times for handoff. For example, some embodiments may monitor signal to noise ratio, signal quality and packet error rate to indicate link quality of a WLAN link. In such cases, the LQI may comprise a three-dimensional vector (e.g., LQI=[SNR SQ PER]) or a scalar value that is a function of such metrics (e.g., LQI=f(SNR, SQ, PER)). In these situations, a threshold trigger value may comprise a vector or scalar value, respectively.

As an example, when LQI of WLAN link 18b comprises three-dimensional vector [SNR, SQ, $PER_{max}$–PER], the trigger threshold above which the LQI of link 18b must stay for the drop count duration may comprise [$SNR_{thr}$, $SQ_{thr}$, $PER_{max}$–$PER_{thr}$]. In such case, one qualification for a handoff to be triggered may be if the lowest component of the vector yielded when the trigger threshold vector is subtracted from the LQI vector is less than zero for the drop count duration.

As another example, when LQI of WLAN link 18b comprises a scalar value f(SNR, SQ, PER) determined by a function of three metrics. For example, the LQI of WLAN link 18b may comprise $w_1$*(SNR–$SNR_{min}$)/($SNR_{max}$–$SNR_{min}$)+$w_2$*(SQ–$SQ_{min}$)/($SQ_{max}$–$SQ_{min}$)+$w_3$*($PER_{max}$–PER)/$PER_{max}$, where weights $w_1$, $w_2$ and $w_3$ are chosen such that $w_1$+$w_2$+$w_3$=100. Thus, a function is performed on three metric parameters to yield a single scalar value to represent link quality. In this case, the trigger threshold may comprise f($SNR_{th}$, $SQ_{th}$, $PER_{th}$).

FIG. 3 is a flowchart illustrating a method for handing off a call between networks, in accordance with a particular embodiment of the present invention. The method begins at step 100 where a quality of a first link between a mobile station and a WLAN is monitored when the mobile station is actively connected with the WLAN on a call. At step 102, a quality of a second link between the mobile station and a cellular network is monitored when the mobile station is actively connected with the WLAN on the call. The monitoring of the qualities of the first and second links may comprise monitoring one or more WLAN link metrics and cellular link metrics, respectively.

At step 104, if the quality of the first link is less than a handoff trigger threshold for a drop count duration then the method proceeds to step 106. At step 106, if the quality of the second link is greater than a minimum cellular link quality threshold then the method proceeds to step 108. At step 108, the call is handed off from the WLAN to the cellular network.

At step 110, a handoff back from the cellular network to the WLAN is prevented until a dwell timer has expired. At step 112, the quality of the first link between the mobile station and the WLAN is monitored. At step 114, if the quality of the first link is greater than the handoff trigger threshold increased by a hysteresis margin for a pick-up count duration, then the method proceeds to step 116. At step 116, the call is handed off from the cellular network to the WLAN.

While the flowchart of FIG. 3 illustrates a situation in which the WLAN is a preferred network, it should be understood that in other embodiments the cellular network may be the preferred network such that the quality of the cellular link is a controlling factor regarding the network to which the mobile station is actively connected. It should also be understood that the teachings and functionality discussed herein with respect to a mobile station on a current call with a network can also be utilized during a call setup process (e.g., as the mobile station is deciding to which network it should be actively connected to begin a call).

Some of the steps illustrated in FIG. 3 may be combined, modified or deleted where appropriate, and additional steps may also be added to the flowchart. Additionally, steps may be performed in any suitable order without departing from the scope of the invention.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 10 and mobile station 12, these elements may be combined, rearranged or positioned in order to accommodate particular routing architectures or needs. In addition, any of these elements may be provided as separate external components to each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims. Moreover, the present invention is not intended to be limited in any way by any statement in the specification that is not otherwise reflected in the claims.

What is claimed is:

1. A method for handing off a call between networks, comprising:
    monitoring a quality of a first link between a mobile station and a wireless local area network (WLAN) when the mobile station is actively connected with the WLAN on a call;
    monitoring a quality of a second link between the mobile station and a cellular network when the mobile station is actively connected with the WLAN on the call
    triggering a handoff of the call from the WLAN to the cellular network when the quality of the first link is less than a handoff trigger threshold for a drop count duration and when the quality of the second link is greater than a minimum cellular link quality threshold;
    preventing a handoff of the call from the cellular network to the WLAN until expiration of a first amount of time as long as the quality of the second link remains above the minimum cellular link quality threshold;
    monitoring the quality of the first link between the mobile station and the WLAN when the mobile station is actively connected with the cellular network on the call; and
    triggering a handoff of the call from the cellular network to the WLAN when the quality of the first link is greater than the handoff trigger threshold plus a hysteresis margin for a pick-up count duration.

2. The method of claim 1, further comprising tuning a control to change a value of the hysteresis margin.

3. The method of claim 1, further comprising tuning a control to change a value of the drop count duration.

4. The method of claim 1, further comprising tuning a control to change a value of the first amount of time.

5. A system for handing off a call between networks, comprising a mobile station comprising a controller operable to:
    monitor a quality of a first link between the mobile station and a wireless local area network (WLAN) when the mobile station is actively connected with the WLAN on a call;
    monitor a quality of a second link between the mobile station and a cellular network when the mobile station is actively connected with the WLAN on the call;
    trigger a handoff of the call from the WLAN to the cellular network when the quality of the first link is less than a handoff trigger threshold for a drop count duration and when the quality of the second link is greater than a minimum cellular link quality threshold;
    prevent a handoff of the call from the cellular network to the WLAN until expiration of a first amount of time as long as the quality of the second link remains above the minimum cellular link quality threshold;
    monitor the quality of the first link between the mobile station and the WLAN when the mobile station is actively connected with the cellular network on the call; and
    trigger a handoff of the call from the cellular network to the WLAN when the quality of the first link is greater than the handoff trigger threshold plus a hysteresis margin for a pick-up count duration.

6. The system of claim 5, wherein the mobile station further comprises a tuning knob operable to tune the hysteresis margin to change its value.

7. The system of claim 5, wherein the mobile station further comprises a tuning knob operable to tune the drop count duration to change its value.

8. The system of claim 5, wherein the mobile station further comprises a tuning knob operable to tune the first amount of time to change its value.

9. A system for handing off a call between networks, comprising:
    means for monitoring a quality of a first link between a mobile station and a wireless local area network (WLAN) when the mobile station is actively connected with the WLAN on a call;
    means for monitoring a quality of a second link between the mobile station and a cellular network when the mobile station is actively connected with the WLAN on the call;
    means for triggering a handoff of the call from the WLAN to the cellular network when the quality of the first link is less than a handoff trigger threshold for a drop count duration and when the quality of the second link is greater than a minimum cellular link quality threshold;
    means for preventing a handoff of the call from the cellular network to the WLAN until expiration of a first amount of time as long as the quality of the second link remains above the minimum cellular link quality threshold;
    means for monitoring the quality of the first link between the mobile station and the WLAN when the mobile station is actively connected with the cellular network on the call; and
    means for triggering a handoff of the call from the cellular network to the WLAN when the quality of the first link is greater than the handoff trigger threshold plus a hysteresis margin for a pick-up count duration.

10. A method for handing off a call between networks, comprising:

monitoring a quality of a first link between a mobile station and a cellular network when the mobile station is actively connected with the cellular network on a call;

monitoring a quality of a second link between the mobile station and a wireless local area network (WLAN) when the mobile station is actively connected with the cellular network on the call;

triggering a handoff of the call from the cellular network to the WLAN when the quality of the first link is less than a handoff trigger threshold for a drop count duration and when the quality of the second link is greater than a minimum WLAN link quality threshold;

preventing a handoff of the call from the WLAN to the cellular network until expiration of a first amount of time as long as the quality of the second link remains above the minimum WLAN link quality threshold;

monitoring the quality of the first link between the mobile station and the cellular network when the mobile station is actively connected with the WLAN on the call; and triggering a handoff of the call from the WLAN to the cellular network when the quality of the first link is greater than the handoff trigger threshold plus a hysteresis margin for a pick-up count duration.

11. The method of claim 10, further comprising tuning a control to change a value of the hysteresis margin.

12. The method of claim 10, further comprising tuning a control to change a value of the drop count duration.

13. The method of claim 10, further comprising tuning a control to change a value of the first amount of time.

14. The method of claim 10, wherein monitoring a quality of a first link between a mobile station and a cellular network comprises monitoring a cellular metric.

15. The method of claim 10, wherein monitoring a quality of a second link between the mobile station and a WLAN comprises monitoring a WLAN metric.

* * * * *